(12) United States Patent
Steiner

(10) Patent No.: US 8,953,773 B2
(45) Date of Patent: Feb. 10, 2015

(54) INCORPORATING INTERACTIVE VOICE RESPONSE FUNCTIONS INTO A WORK ASSIGNMENT ENGINE SCRIPT

(71) Applicant: Avaya Inc., Basking Ridge, NJ (US)

(72) Inventor: Robert C. Steiner, Broomfield, CO (US)

(73) Assignee: Avaya Inc., Basking Ridge, NJ (US)

(*) Notice: Subject to any disclaimer, the term of this patent is extended or adjusted under 35 U.S.C. 154(b) by 12 days.

(21) Appl. No.: 13/622,550

(22) Filed: Sep. 19, 2012

(65) Prior Publication Data

US 2014/0079193 A1 Mar. 20, 2014

(51) Int. Cl.
*H04M 3/00* (2006.01)
(52) U.S. Cl.
USPC .................................. 379/265.02; 379/88.18
(58) Field of Classification Search
CPC .. H04M 2201/40; H04M 1/271; H04M 3/493
USPC .................. 379/88.01, 88.04, 88.18, 265.01, 379/265.13
See application file for complete search history.

(56) References Cited

U.S. PATENT DOCUMENTS

| | | | |
|---|---|---|---|
| 5,987,116 A * | 11/1999 | Petrunka et al. | 379/265.13 |
| 7,949,121 B1 | 5/2011 | Flockhart et al. | |
| 2005/0047559 A1* | 3/2005 | Colson et al. | 379/88.18 |
| 2007/0201677 A1* | 8/2007 | Bates et al. | 379/265.01 |
| 2010/0166158 A1 | 7/2010 | Costello et al. | |
| 2010/0235218 A1 | 9/2010 | Erhart et al. | |
| 2010/0296417 A1 | 11/2010 | Steiner | |
| 2011/0075819 A1* | 3/2011 | Bruce et al. | 379/88.04 |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2011/0255685 A1 | 10/2011 | Flockhart et al. | |

* cited by examiner

*Primary Examiner* — Fan Tsang
*Assistant Examiner* — Van D Huynh
(74) *Attorney, Agent, or Firm* — Sheridan Ross P.C.

(57) ABSTRACT

A contact center is described along with various methods and mechanisms for administering the same. In general, methods and mechanisms are disclosed that are configured to provide interactive voice response (IVR) functionality as one or more distributed resources capable of being assigned work items via a work assignment engine. Assigning work items may be performed via the work assignment engine running an IVR script. This IVR script may be configured to determine information associated with a work item such that an efficient work assignment can be made. In some cases, business rules and the information associated with the work item can affect the work assignment.

20 Claims, 3 Drawing Sheets

INCORPORATING INTERACTIVE VOICE RESPONSE FUNCTIONS INTO A WORK ASSIGNMENT ENGINE SCRIPT

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, a single agent often no longer has all of the skills, expertise, or availability to fully service customer contacts. To service customer contacts more effectively, contact centers route contacts to one or more resources with specific skills and attributes. These attributes and/or skills may include but are not limited to proficiency in spoken languages, technical expertise, communication ability (e.g., sign language, TTY, texting, SMS, email, phone, video phone, and the like), preferred work type, and combinations thereof. For example, contact centers that handle computer customer service may have application resources, hardware resources, operating system resources, network resources, etc. While these resources may be well-qualified to answer questions on their particular subject(s), they are often unqualified to answer questions involving subjects outside of their respective skill sets. Still, these resources may be assigned to work items based on at least one attribute, skill, and rule-based match used by a contact center's work assignment mechanism.

It is one goal of a contact center to maintain good customer service when handling contacts, and as such, work items are typically assigned to qualified agents in a timely and efficient manner. Many contact centers utilize an IVR system to determine information (e.g., attributes, historical data, etc.) associated with a contact that may be used in assigning the work items. However, since the IVR system is typically used as a gatekeeper to the contact center, informational messages must be transmitted to and from the IVR system to facilitate accurate work assignments. As can be appreciated, the large number of messages sent and received via the IVR system can cause a strain on the valuable processing resources of a contact center.

SUMMARY

It is with respect to the above issues and other problems that the embodiments presented herein were contemplated. In general, embodiments of the present disclosure provide methods, devices, and systems that incorporate IVR functionality as part of the work assignment engine script of a contact center. A typical IVR unit, or IVR system, acts as a gateway into a contact center. Traditionally, an IVR unit contains all of the contact center's IVR functionality that may be used to identify received contact information. From the IVR unit, a received contact may be subjected to one or more IVR functions before any work assignment decision is made. As can be appreciated, an IVR unit suffers from messaging and processing shortcomings, especially in a distributed contact center environment. Embodiments of the present disclosure allow the functionality of an IVR unit to be distributed as IVR resources. In some embodiments, work items may be routed through one or more IVR resources via a work assignment engine.

In some embodiments, a work assignment engine may be configured to assign work items to specific IVR functions and/or routines. Such IVR functions and/or routines may include, but are not limited to, customer prompts, information gathering (e.g., via one or more interactive customer interface, touchpad, keyboard, voice, and other input device, etc.), information presentation (e.g., estimated wait time, advertising, customer information, verification responses, etc.), delay functions, and the like. Additionally, or alternatively, these IVR functions may be split into separate blocks, where they can be applied individually and/or incrementally to a work item. This separate IVR block approach may treat each IVR block as an IVR resource that can be assigned to a work item. In some embodiments, the IVR functions may be combined such that associated IVR functions may be grouped as a single logical and functional IVR resource. For example, a work item may be created to represent a new customer received at a contact center. In this case, the work item may be assigned to a grouped IVR resource to, among other things, prompt the new customer for information, obtain new customer data, store the obtained customer data, and even inform the customer of available products/services.

In accordance with embodiments of the present disclosure, a work item may be created to represent a contact received at a contact center. In some embodiments, this work item may be created to include information (e.g., customer number, name, grade and/or paid-for service level, historical data, and the like) relating to the contact. Among other things, the information associated with the work item may be used to create specific IVR resource sequencing for the customer associated with the work item. Additionally, or alternatively, the information may be used to assign the contact to one or more resources. For instance, the work assignment engine may determine that a work item represents a valuable customer who has paid for a high service level. In this case, the customer may be associated with historical data that can be used in assigning the work item to a resource. As can be expected, the work item may then be routed to an agent resource, rather than forwarding the work item to an IVR resource. However, in some embodiments, the same work item may be forwarded to an IVR resource before it is routed to an agent, or other, resource. In some cases, sending the work item to an IVR resource may provide additional information needed in routing the work item to an appropriate resource for further handling.

The present disclosure provides scenarios where a contact center can consider functional processing aspects, including agents, endpoints, IVR functions, and the like, as resources. These resources can include one or more functions performed by a personal computer such as, playing recordings, performing speech-to-text operations, obtaining interactive input received from a customer, and even hosting a conference session. In some embodiments, the resources may be assigned similar to resources that are part of an interchange (e.g., conference bridge, hosting module, etc.) in a queueless contact center. In other words, an interchange can contain all of a personal computer's resources, and it is anticipated that each personal computer in a contact center network includes an interchange. In one embodiment, the interchange may operate as a data conference component that can be configured to connect multiple resources together (e.g., in a grid-based contact center as disclosed herein).

Similar to the function of an interchange, where a work assignment engine is invoked to find the next node and/or resource in a contact center, the work assignment engine as presently disclosed may connect resources together to perform IVR functionality of a contact center. In other words, at each connection point in the work flow, the work assignment engine may be invoked to find the next resource for the work item. For example, a work item may be directed to a first resource such as a prompt module, a human agent, a speech-to-text module, and/or a webpage. Because each of these resources are distributed, and do not rely upon a single dedicated functional unit, the resources may be updated and scaled individually, or in combination, without requiring specialized hardware. In some embodiments, each IVR resource may represent one or more nodes in a work flow. Because each of the one or more IVR nodes are independent, they may also be independently updated and/or scaled. Additionally, or alternatively, leveraging the knowledge of the contact center in the work flow of one or more work items allows resource decisions to be made at decision points and can result in simplified implementation, simplified resource management, and reduced messaging between hardware and/or software components.

In accordance with embodiments of the present disclosure, the work assignment engine merges IVR work flow decisions with call routing. As such, the work assignment engine may be configured to make optimal routing decisions for one or more work items at any point in a work flow. In some cases the optimal routing decision may include passing the work item to a first IVR resource. Alternatively, the optimal routing decision may involve directing the work item to one or more human resources. In any event, the work assignment engine may be configured to make routing decisions in accordance with information associated with the work item. It should be understood that the work flow decisions made by the work assignment engine can include any number of routing decisions and any combination of resources. For example, the work flow of a particular work item may include routing to a first, second, and even third IVR resource as well as a first, second, and even third human resource in any order.

It is anticipated that the assignment of a work item to one or more resources, including IVR resources, may depend on matching associated attributes. Examples of attributes that a resource may possess include, without limitation, language ability, fluency for a language, level of understanding for a language, skill (e.g., billing, customer service, troubleshooting, accounts receivable, accounts payable, product knowledge, etc.), skill level (e.g., trainer, trainee, expert, associate, etc.), willingness to participate, attitude rating (e.g., via peer, customer, supervisor, technical, survey, etc.), gender, age, nationality, experience, historical KPIs (e.g., call resolution rate, close rate, conversion rate, etc.), busyness, location, availability, presence information, preferred communication type (e.g., media, medium, real-time, near-real-time, non-real-time, etc.), communication device type, and combinations thereof. In some cases an IVR resource may have its own unique attributes. However, as a resource, an IVR resource may have one or more specific subsets of the resource attributes. IVR resource attributes may include, but are not limited to communication medium (e.g., email, voice call, video call, teletypewriter ("TTY"), telecommunication device for the deaf ("TDD"), text, instant messaging ("IM"), etc.), language ability, contact type (e.g., live call, real-time, near-real-time, non-real-time, etc.), skill level (e.g., prompts and/or information may be suited to skill detected and/or determined) combinations thereof, and the like. In some embodiments, an IVR resource and a non-IVR resource (e.g., a resource other than an IVR resource) may have common attributes that can be used in work assignment. For example, an IVR resource may have a Spanish language attribute, a real-time attribute, and a voice call attribute. In this example, a non-IVR resource (e.g., human agent, etc.) may have attributes in common with the IVR resource. Specifically, the human agent non-IVR resource may also have a Spanish language attribute, real-time attribute (e.g., associated with availability, preferred contact type, set contact type, etc.), and a voice call attribute (e.g., the agent may be equipped with a voice call device, etc.). Accordingly, the work assignment engine may simultaneously consider the IVR resource and the human agent non-IVR resource for work assignment of a given work item. As disclosed herein, one or more of the attributes may be associated with corresponding and/or complementary attributes of a work item. For instance, it may be determined that a received work item is associated with a high-paying customer (e.g., Platinum, Gold, etc.), and as such, may require an expert resource, fluent in a specific language, and trained in given skill set. The work item may then be matched to the appropriate resource based on matching the associated attributes of the work item and the resource.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magnetooptical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
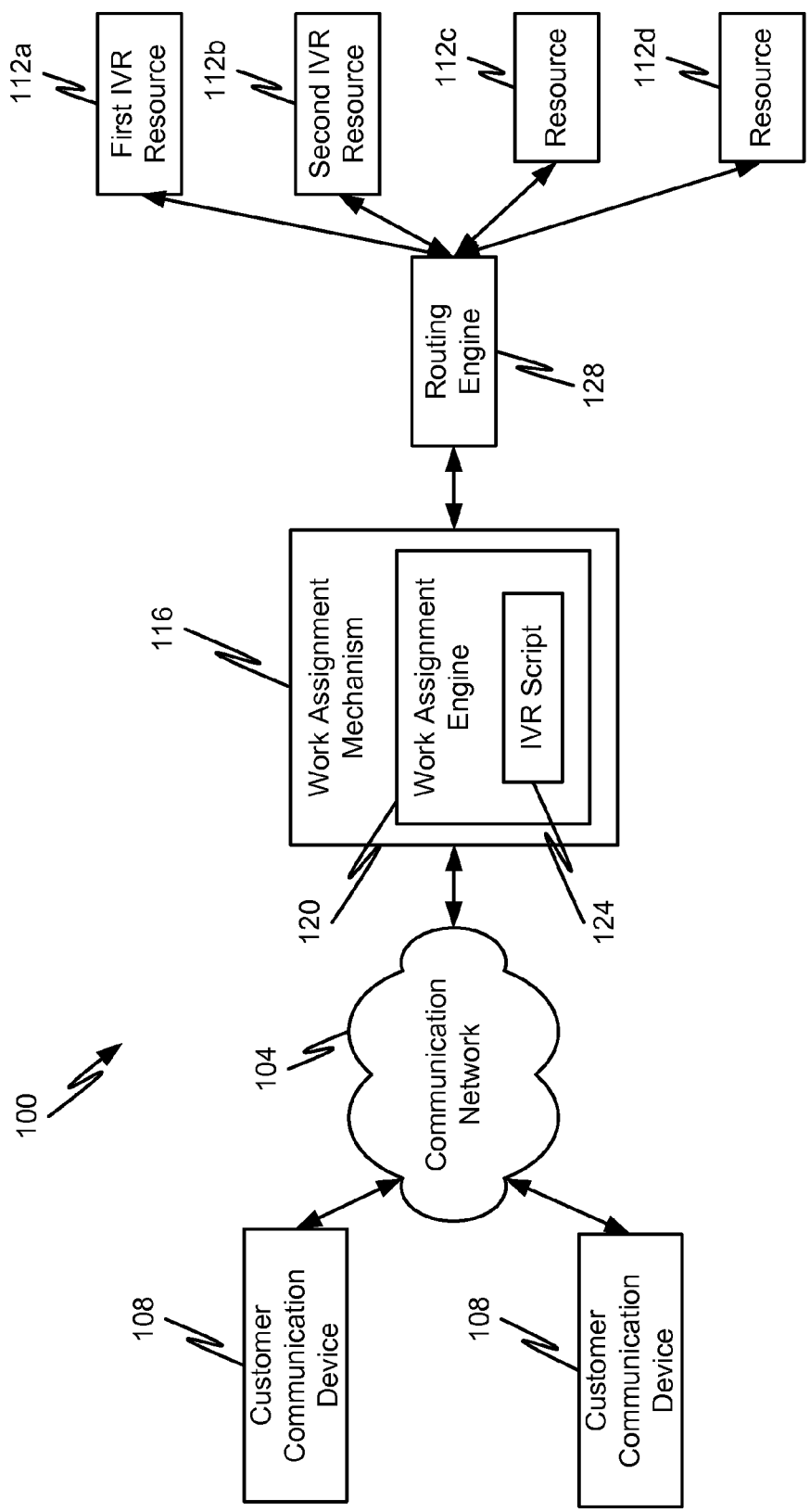
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128.

The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers. In some embodiments, the resources may include one or more IVR resources 112a, 112b, that are configured to apply individual IVR functions. In other words, the individual IVR functions may be those functions that are commonly associated as residing together in a dedicated IVR unit. For example, the first IVR resource 112a, may include the functionality associated with prompting a customer for information. Once the first IVR resource 112a has performed its functionality for a first work item, it may be passed back to the work assignment engine 120. Next, the work assignment engine 120 may route the first work item to the second IVR resource 112b, which may perform a music-playing function, and so on. Although one or more IVR functions may be combined in an IVR resource 112a, 112b, the IVR resources 112a, 112b disclosed herein are not necessarily equivalent to a dedicated IVR unit. Unlike dedicated IVR units, the present disclosure recites that the IVR resources 112a, 112b may be distributed and separate from each other.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In some embodiments, the work assignment engine 120 may utilize an IVR script 124 to determine work item assignments for created work items. In general, the IVR script 124 may be configured to determine whether a work assignment will route a work item to an IVR resource 112a, 112b. The IVR script 124 may be initiated by the work assignment engine 120 determining one or more triggering conditions that are associated with a work item. Additionally, or alternatively, the IVR script 124 may be caused to initiate in response to a previous work assignment and/or routing decision. In one embodiment, the IVR script 124 may be configured to run as directed by rules.

Upon analyzing a received work item, the work assignment engine 120 may apply the IVR script 124 based on data associated with the work item. For example, it is anticipated that as a work item proceeds through the work flow of a contact center, data may be associated with the work item that can be used to affect work flow decisions. The data associated with the work item may include, but is not limited to, tracking information, customer data, timing information, resource allocations, and the like. In some cases the IVR script 124 may use this associated data to determine work assignments, especially with regard to IVR resources 112a, 112b.

Figure 2:
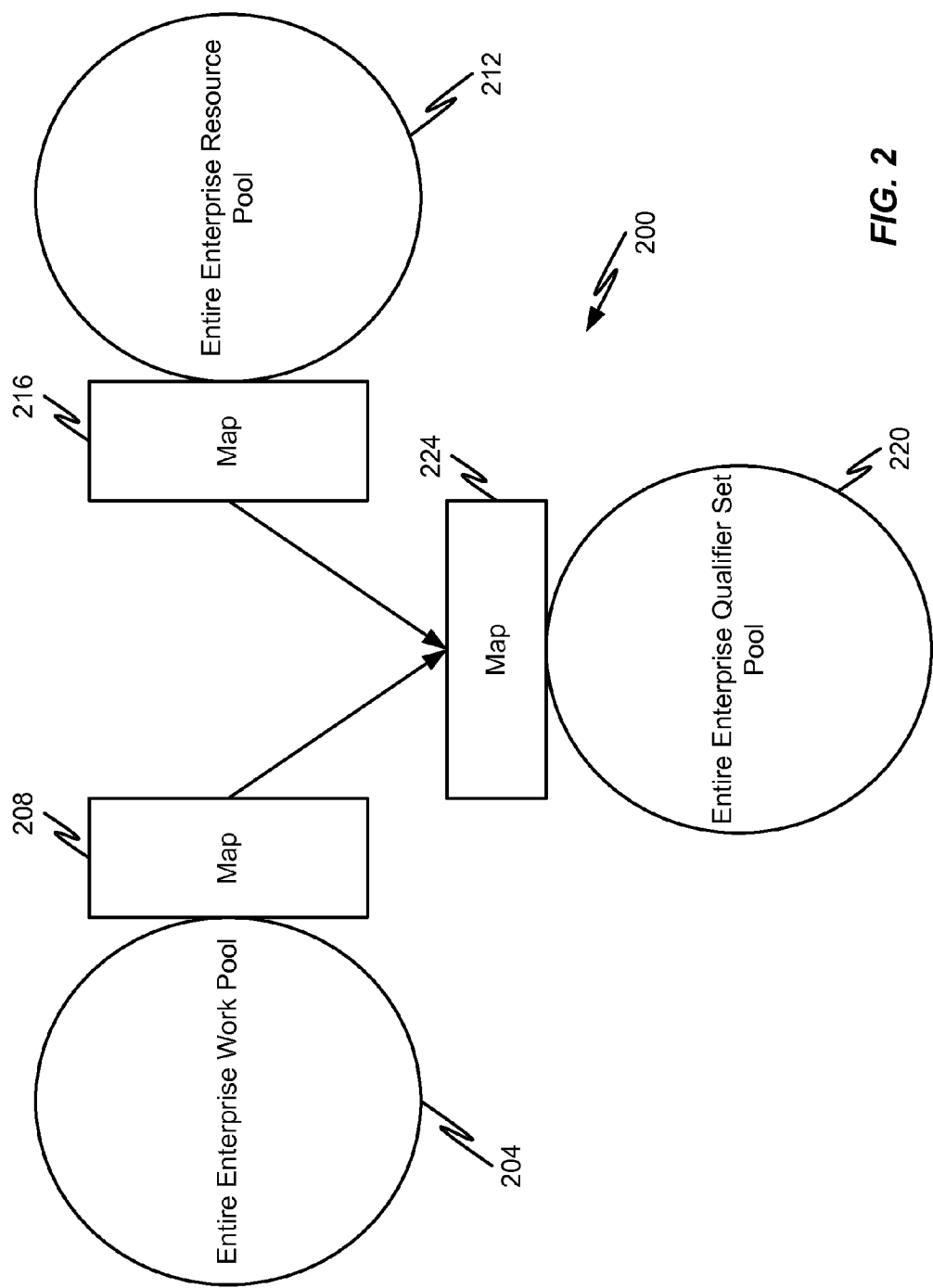
FIG. 2 is a block diagram depicting exemplary pools and bitmaps that are utilized in accordance with embodiments of the present disclosure.

FIG. 2 depicts exemplary data structures 200 which may be incorporated in or used to generate bitmaps/tables used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, and/or when rules for administering the contact center have changed).

Figure 3:
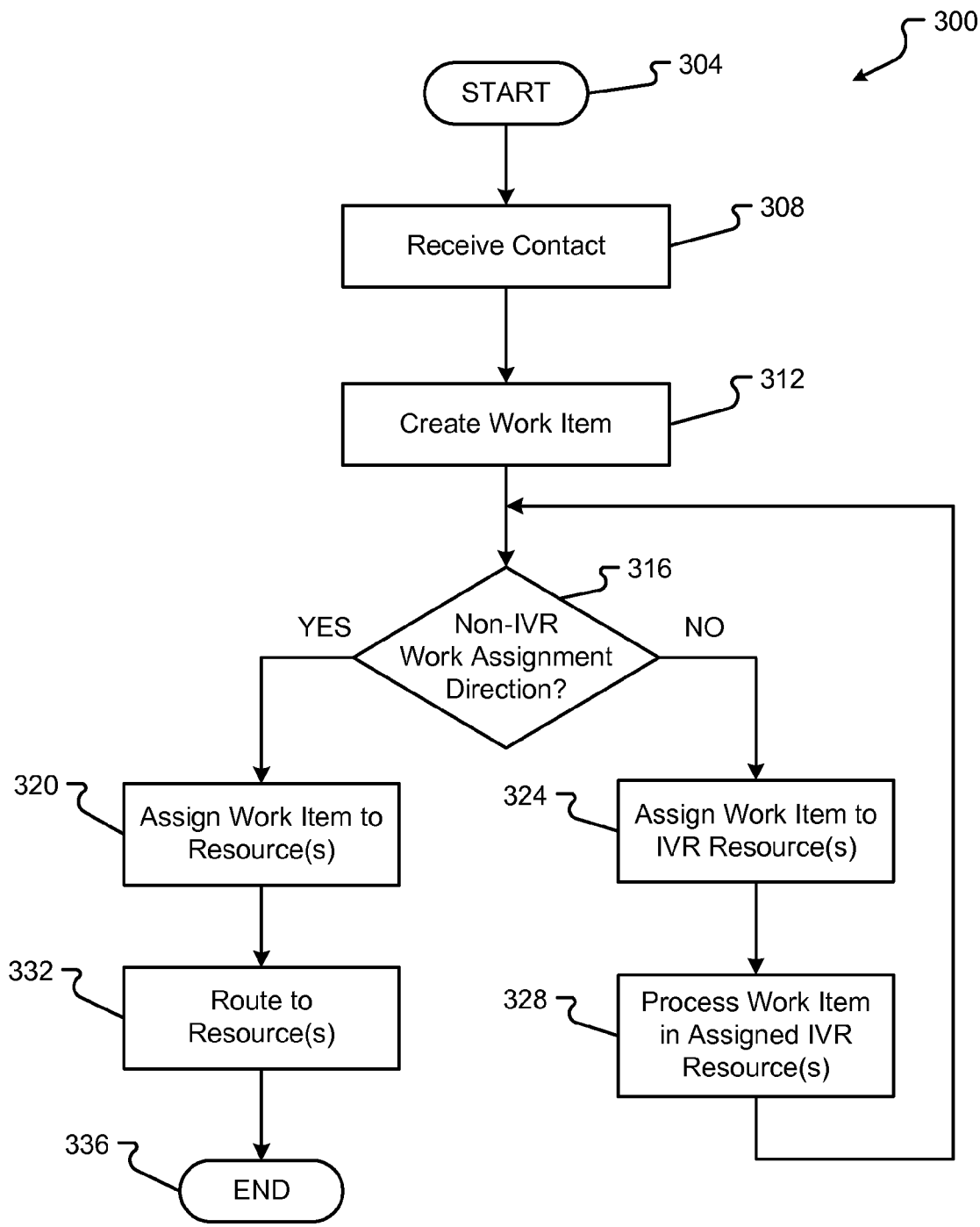
FIG. 3 is a flow diagram depicting a method for routing work items to resources via a work assignment engine utilizing an IVR script in accordance with embodiments of the present disclosure.

Referring to FIG. 3 a flow diagram is provided in accordance with embodiments of the present disclosure depicting a method 300 of routing work items to resources via a work assignment engine utilizing an IVR script 124. The method 300 begins at step 304 and proceeds when a contact is received by the work assignment mechanism 116 of a contact center (step 308). The contact may be analyzed for information relating to the contact type and other information that may be used to aid in the efficient routing within at least one workflow. This analysis may be performed by the work assignment mechanism 116, through its various components. Categories of information relating to the contact may include, but are not limited to, subject matter, urgency level, customer grade or level, customer identification, requested resource(s), and workflow status, to name a few.

The method 300 continues by creating a work item based at least partially on receiving and/or analyzing the contact (step 312). As described above, each received contact may be analyzed for information to aid in routing and/or queuing to one or more resources 112, including IVR resources 112a, 112b and non-IVR resources 112c, 112d. This information may be associated with the work item in some form (e.g., via a bit map, bit table, hash function, hash table/map, data structure, database, etc.). In one embodiment, the information may be used to determine whether the work item should be routed to an IVR resource 112a, 112b and/or other resource 112c, 112d for further processing. For example, the work assignment engine 120 may determine that the work item lacks adequate information to route the work item to a non-IVR resource 112c, 112d. Accordingly, the work item may be routed to one or more resources 112, especially IVR resources 112a, 112b, to obtain this routing information.

In accordance with embodiments of the present disclosure, it is anticipated that the categories of information and other information related to a contact, and even associated with a work item, may be provided via manual input, automated processes, and/or combinations thereof. In one embodiment, the manual input may be provided by a customer who is requesting a resource. This manual input may be provided in response to one or more human agent and automated resource (e.g., IVR) prompts. Additionally, or alternatively, the work assignment mechanism 116, upon receiving a contact, may automatically determine the contact source (via IP address, MAC address, and the like), associations, type, and customer. This data may be used to further determine prior contacts, historical data, customer quality levels, languages, geographic resources, and the like.

When a work item is created, the work assignment engine 120 may determine how to direct the work item in a contact center based on the information associated with the work item (step 316). In some cases, this determination may be made by detecting a lack of associated information with a work item. In any event, embodiments of the present disclosure anticipate that the work assignment mechanism 116 may employ the use of the IVR script 124 to determine an appropriate work assignment. In one embodiment the IVR script 124 may be selectively used based on at least one of contact analysis, contact center state, administrative rules, and resource 112 availability. This selective use of the IVR script 124 may be performed automatically (e.g., in response to the contact analysis or input provided by a customer, resource, and/or IVR). Additionally, or alternatively, the work assignment engine 120 may apply the IVR script 124 to every received work item to determine IVR resource 112a, 112b and/or non-IVR resource 112c, 112d direction/routing.

In one embodiment, the IVR script 124 may refer to an identifier associated with the work item to determine an initial work item routing direction. For example, a work item may be directed to an IVR resource 112a, 112b upon determining that the work item is not currently associated with any customer information. In another example, the work item may be directed to a non-IVR resource 112c, 112d for handling based on identified information associated with the work item.

In the event that the work assignment engine 120 has determined that the work item should be routed to a non-IVR resource 112c, 112d, the method 300 continues, at step 320, by assigning the work item to the non-IVR resource 112c, 112d determined. The work assignment may be performed by the work assignment engine 120 in accordance with one or more work assignment selection mechanisms. In some embodiments, the work item may be assigned by the work assignment engine 120 without applying the IVR script 124 to the work item. In other embodiments, the work item may be assigned after the IVR script 124 has been applied to the work item. When the work item is assigned it may be routed to the assigned handling, or non-IVR, resource 112c, 112d (step 332). In some embodiments, the routing may be performed by a routing engine 128 of a contact center. Once the work item has been routed, the method 300 may end (step 336).

However, if the work assignment engine 120 determines that the work item should be routed to an IVR resource 112a, 112b, the method 300 continues at step 324. It is anticipated that the IVR resources 112a, 112b may represent different function, or groups of functions of an IVR unit. For example, a first IVR resource 112a may be associated with a customer prompt and information gathering functionality. Additionally, or alternatively, a second IVR resource 112b may represent an information presentation function (e.g., music playing, advertising message, estimated wait time presentation, etc.). In this case, a customer may be prompted for key pieces of information via the first IVR resource 112 that can be used to determine further work assignment decisions.

At this point, the work item may be processed according to the information gathered by the IVR resource 112a, 112b (step 328). Among other things, processing the work item may include updating information associated with the work item. In the event that the work item is not determined to be associated with any information, the IVR resource 112a, 112b, may determine to create the associated information and associate it with the work item. This associated information may include, but is not limited to, customer information (e.g., customer number, name, IP address, MAC address, grade and/or paid-for service level, etc.), attribute criteria, subject matter requested, routing information, timing information, and the like. As can be appreciated, the associated information may be obtained automatically and/or via human input provided (e.g., via an input device). This data may be detected via the IVR resource 112a, 112b, and may even be saved in a memory.

In one example, the IVR resource 112a, 112b may prompt a customer to enter a customer number via some input device (e.g., voice, keyboard, pushbuttons, touchpad, mouse click, timed options, etc.). The IVR resource 112a, 112b may be configured to refer to a database, or memory, of stored customer numbers to determine a potential match with the input customer number. In the event that a match is determined, the work item may be associated with some, or all, of the stored data associated with that customer number. In some cases, this work item may be returned to the work assignment engine 120 for a work assignment in accordance with the customer number (e.g., return to step 316).

In some embodiments, the subsequent work assignment performed by the work assignment engine 120 may be at least partially based on business rules. One business rule may classify a customer by value (e.g., associate a customer with a paid-for quality of service level such as Platinum, Gold, Silver, and Bronze, where Platinum takes priority over Gold, Gold takes priority over Silver, and so on). It is anticipated that high-priority customers may be treated differently than low-priority customers. For instance, a work item associated with a low-priority customer may be sent to another IVR resource 112a, 112b for further processing, while a high-priority customer may be sent to a non-IVR resource 112c, 112d for non-IVR handling (e.g., interaction with a human agent, technical specialist, group, and the like). It should be appreciated that different business rules may apply for various customers. In one embodiment, these business rules may determine the work assignment of a work item through one or more IVR resources 112a, 112b and/or non-IVR resources 112c, 112d.

By way of example, a work item may be sent to a first IVR resource 112a, processed via the first IVR resource 112a (e.g., a message-playing or media resource), and then returned to the work assignment engine 120 for further processing. In accordance with embodiments disclosed herein, the work assignment engine 120 may then determine to send the work item to a second IVR resource 112b (e.g., an information gathering resource)(step 324) for further processing (step 328). It is anticipated that this process may repeat and the work item may be routed to a third IVR resource, fourth IVR resource, and so on via the work assignment engine 120. Additionally, or alternatively, the work item may be routed to a non-IVR resource 112c, 112d at any time the work item is processed by the work assignment engine 120 (step 316). Once the work item is assigned to a non-IVR resource 112c, 112d the method 300 may end (step 336). The method 300 may be caused to repeat from step 316 based on rules and/or input provided via the customer, work item, and/or assigned resource.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   analyzing, via a work assignment engine, a work item for work assignment information, wherein the work item represents a contact received at a contact center;
   determining, via the work assignment engine, whether the work assignment information includes customer information for assigning the work item to a resource of the contact center other than an interactive voice response (IVR) resource;
   determining, via the work assignment engine, a first IVR resource of a plurality of IVR resources that is capable of obtaining a first portion of the customer information when the work assignment information does not include the customer information; and
   assigning, via the work assignment engine, the work item to the first IVR resource when it is determined that the work assignment information does not include the customer information, wherein the first IVR resource is configured to execute a first IVR function configured to obtain the first portion of the customer information, wherein the first IVR function represents an individual IVR function that is separate and apart from an IVR unit and other IVR functions, and wherein the first IVR resource is configured to automatically return the work item to the work assignment engine after executing the first IVR function.

2. The method of claim 1, wherein each determination is made by applying an IVR script in the work assignment engine.

3. The method of claim 2, wherein the IVR script is configured to run automatically upon completion of the analyzing step.

4. The method of claim 1, wherein the work assignment information comprises information associated with a customer.

5. The method of claim 4, wherein the information associated with a customer includes at least one of a customer number, customer name, IP address, MAC address, customer grade, and paid-for service level.

6. The method of claim 1, further comprising:
   processing the work item via the first IVR resource, wherein processing the work item includes executing the first IVR function; and
   returning the processed work item to the work assignment engine.

7. The method of claim 6, wherein the processing step further comprises:
   following processing of the work item via the first IVR resource, updating the work assignment information and the customer information for the processed work item.

8. The method of claim 7, further comprising:
   analyzing, via the work assignment engine, the processed work item for updated work assignment information;
   detecting, via the work assignment engine, that the updated work assignment information does not include the customer information for assigning the work item to the resource of the contact center other than the IVR resource;
   determining, via the work assignment engine, a second IVR resource of the plurality of IVR resources that is capable of obtaining a second portion of the customer information when the work assignment information does not include the customer information; and
   assigning, via the work assignment engine, the processed work item to the second IVR resource of a plurality of IVR resources that is capable of obtaining the second portion of the customer information, wherein the second IVR resource is configured to execute a second IVR function separate and apart from an IVR unit and the first IVR resource, and wherein the second IVR function is different from the first IVR function, and wherein the second IVR resource is configured to automatically return the work item to the work assignment engine after executing the second IVR function.

9. The method of claim 7, further comprising:
   analyzing, via the work assignment engine, the processed work item for updated work assignment information and updated customer information;
   detecting, via the work assignment engine, that the updated work assignment information includes the customer information to assign the work item to the resource of the contact center other than the IVR resource; and
   routing the processed work item to resource of the contact center, wherein the resource of the contact center is a human agent.

10. The method of claim 1, wherein determining whether the work assignment information includes customer information further comprises:
    referring, via the work assignment engine, to an identifier associated with the work item, wherein the identifier indicates whether the work item includes the customer information.

11. A non-transitory computer readable medium having stored thereon instructions that, when executed by a processor, perform a method comprising:
    analyzing, via a work assignment engine, a work item for work assignment information, wherein the work item represents a contact received at a contact center;
    determining, via the work assignment engine, whether the work assignment information includes customer information for assigning the work item to a resource of the contact center other than an interactive voice response (IVR) resource;
    determining, via the work assignment engine, a first IVR resource of a plurality of IVR resources that is capable of obtaining a first portion of the customer information when the work assignment information does not include the customer information; and
    assigning, via the work assignment engine, the work item to the first IVR resource when it is determined that the work assignment information does not include the customer information, wherein the first IVR resource is configured to execute a first IVR function configured to obtain the first portion of the customer information, wherein the first IVR function represents an individual IVR function that is separate and apart from an IVR unit and other IVR functions, and wherein the first IVR resource is configured to automatically return the work item to the work assignment engine after executing the first IVR function.

12. The non-transitory computer readable medium of claim 11, wherein the method is performed via an IVR script in the work assignment engine.

13. The non-transitory computer readable medium of claim 12, wherein the IVR script is configured to run automatically upon completion of the analyzing step.

14. The non-transitory computer readable medium of claim 11, wherein the work assignment information comprises information associated with a customer.

15. The non-transitory computer readable medium of claim 14, wherein the information associated with a customer includes at least one of a customer number, customer name, IP address, MAC address, customer grade, and paid-for service level.

16. The non-transitory computer readable medium of claim 11, wherein the method further comprises:
processing the work item via the first IVR resource, wherein processing the work item includes executing the first IVR function; and
returning the processed work item to the work assignment engine.

17. The non-transitory computer readable medium of claim 16, wherein the method further comprises:
following processing of the work item via the first IVR resource, updating the work assignment information and the customer information for the processed work item.

18. The non-transitory computer readable medium of claim 17, wherein the method further comprises:
analyzing, via the work assignment engine, the processed work item for updated work assignment information;
detecting, via the work assignment engine, that the updated work assignment information does not include the customer information for assigning the work item to the resource of the contact center other than the IVR resource;
determining, via the work assignment engine, a second IVR resource of the plurality of IVR resources that is capable of obtaining a second portion of the customer information when the work assignment information does not include the customer information; and
assigning, via the work assignment engine, the processed work item to the second IVR resource of a plurality of IVR resources that is capable of obtaining the second portion of the customer information, wherein the second IVR resource is configured to execute a second IVR function separate and apart from an IVR unit, and wherein the second IVR function is different from the first IVR function, and wherein the second IVR resource is configured to automatically return the work item to the work assignment engine after executing the second IVR function.

19. A contact center, comprising:
a work assignment mechanism contained in memory and executed by a processor, the work assignment mechanism including:
a work assignment engine configured to compare attributes of work items in a work pool with attributes of resources in a resource pool and match the work items to resources based on the comparison of attributes; and
an IVR script configured to analyze a work item for work assignment information, wherein the work item represents a contact received at a contact center, determine whether the work assignment information includes customer information for assigning the work item to a resource of the contact center other than an interactive voice response (IVR) resource, determine a first IVR resource of a plurality of IVR resources that is capable of obtaining a first portion of the customer information when the work assignment information does not include the customer information, and assign the work item to the first IVR resource when it is determined that the work assignment information does not include the customer information, wherein the first IVR resource is configured to execute a first IVR function configured to obtain the first portion of the customer information, wherein the first IVR function represents an individual IVR function that is separate and apart from an IVR unit and other IVR functions, and wherein the first IVR resource is configured to automatically return the work item to the work assignment engine after executing the first IVR function.

20. The contact center of claim 19, wherein the work assignment engine includes the IVR script.

* * * * *